Nov. 8, 1960  G. E. GOULD ET AL  2,959,119
DENSENING MILL
Filed Sept. 28, 1956

INVENTORS.
Gordon E. Gould
Robert S. Mason
BY
Griswold & Burdick
ATTORNEYS

United States Patent Office 2,959,119
Patented Nov. 8, 1960

2,959,119

DENSENING MILL

Gordon E. Gould, Breckenridge, Mich., and Robert S. Mason, San Diego, Calif., assignors to The Dow Chemical Company, Midland, Mich., a corporation of Delaware Filed Sept. 28, 1956, Ser. No. 612,705

2 Claims. (Cl. 100—90)

This invention relates to an improved densening mill and to a densening method for particulate materials that are of the high bulk and low density variety.

It is difficult in the extreme to efficiently densen many light, fluffy and powdery materials on a continuous basis and at substantial processing rates. By way of illustration, when puffy materials of this nature are passed through the bight or nip of conventional, hard and solid surfaced two-roll mills for densening purposes, the air that is being squeezed out of the powder is forced counter to the feed path of the material to the mill. This may cause a great deal of turbulence in the material entering the nip between the rolls and prevent its being fed at any but relatively slow rates.

Certain polymeric materials are available in a particulate form that has an extremely high bulk and low density. This is the case, for example, with certain of the essentially linear and unbranched macro-molecular species of polyethylene (especially those which may be prepared, for example, by relatively low pressure processes with catalyst mixtures of strong reducing agents and compounds of groups IV-B, V-B and VI-B metals of the periodic system) and other polyolefins of a similar nature. Such polyethylenes are usually prepared and initially obtained as a powder having a bulk density of only about three or four pounds per cubic foot as compared with a density of about sixty pounds per cubic foot in the same material when it is in a fused and solidified condition. The extremely high bulk of such powders presents serious storage and handling problems and also involves a fire hazard due to the flammable nature of the material and its propensity, when in the form of such an extremely light powder, to propagate explosive dust conditions. In addition, it is a practical necessity to pre-densify such polymeric materials for subsequent extrusion due to their troublesome nature when charged to extrusion and the like apparatus in an extremely high bulk form.

Therefore, it would be advantageous, and it is among the principal objectives of the present invention, to provide an improved and highly efficacious means and method for densening high bulk particulate materials that would be especially adapted for the purpose of consolidating the referred-to varieties of polyethylene and the like powdery polymeric materials.

In accordance with the present invention, these and related ends may be attained readily with a densening mill for high bulk particulate materials that comprises at least a single roll spaced to closely face an opposing surface, the outer surface of said roll consisting of a relatively flexible layer of an air-permeable foraminulous material having an average intersticial foraminule size finer than the average particle size of the material intended for passage through said mill, a rigid foraminous cylinder supporting said outer surface layer and having coarser foramina therein than the foraminules in said surface layer, means for rotating said roll, and means for urging said roll and said opposing surface together to provide a compressive bight therebetween. Advantageously, the surface opposing said roll is another roll arranged in nip roll fashion. More advantageously, it is a like foraminiferous surfaced roll. High bulk, low density particulate material may be efficiently densened at high processing rates by passing it through a mill in accordance with the present invention.

Further features and advantages of the present invention will be more apparent in the following description and specification taken in connection with the accompanying drawing, wherein.

Figure 1:
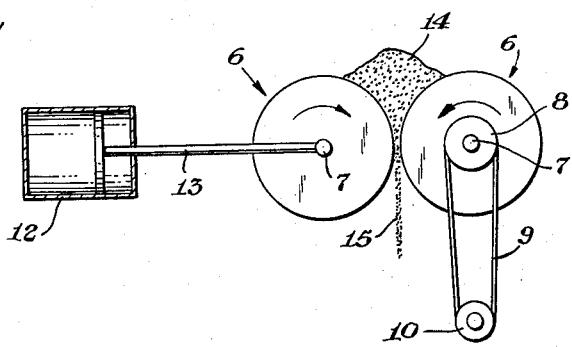
Figure 1 is a schematic representation of a pair of nip rolls providing one embodiment of a densening mill according to the invention.

Referring to Figure 1, there is shown a pair of nip rolls, each indicated generally by the reference numeral 6, that comprise an embodiment of a densening mill according to the present invention. The rolls 6, rotating in opposed directions (as illustrated by the directional arrows) about their individual longitudinal axes 7, are closely spaced to provide a bight or compressive nip between their facing surfaces through which a light, fluffy particulate material 14 can be passed for purposes of being densened to a more consolidated and compact physical form 15.

At least one of the rolls 6 is positively driven, as through chain 9 engaging a sprocket wheel 7 on the roll and powered by a drive sprocket 10. Equivalent drive means such as gear, belt, axle or friction roller drives may be provided on one or both of the rolls. At least one of the rolls 6 is also positively urged against the other to provide a compressive bight therebetween as by the air cylinder and piston arrangement 12 connected through the rod 13 to the roll or by spring loading one or both of the rolls or by other equivalent means.

At least one of the rolls 6 must also be a foraminiferous surfaced roll. Although it is most advantageous for the densening mill to be comprised of at least a single pair of such rolls arranged in the illustrated nip roll manner, it is to be understood that a suitable nip roll arrangement may consist of a foraminiferous roll arranged with a solid surfaced roll. In addition, a densening mill in accordance with the invention may also comprise a foraminiferous surfaced roll facing an opposing plane or relatively plane surface such as a flat, stationary surface or a moving belt or may be embodied as a moving foraminiferous surfaced roll facing and relatively movable with respect to a facing stationary surface. Furthermore, as indicated, the densening mill may also comprise a sequential series of rolls or roll pairs that, advantageously, may have sequentially increasing or progressively related condensing potential.

Figure 2:
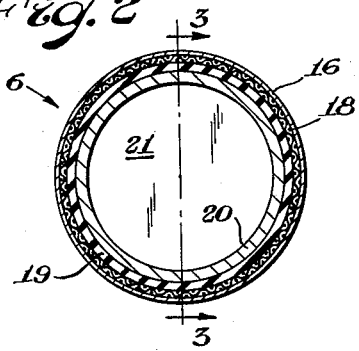
Figure 2 is a schematic representation in a cross-section of a foraminiferous surfaced roll for densening mills in accordance with the invention.
Figure 3:
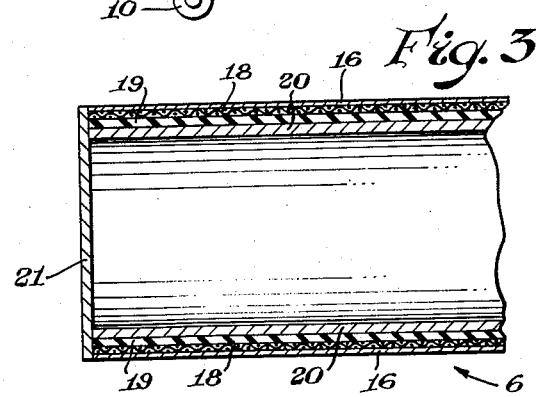
Figure 3 is a fragmentary cross-sectional plan view of the roll taken along the line 3—3 in Figure 2.
Figure 4:
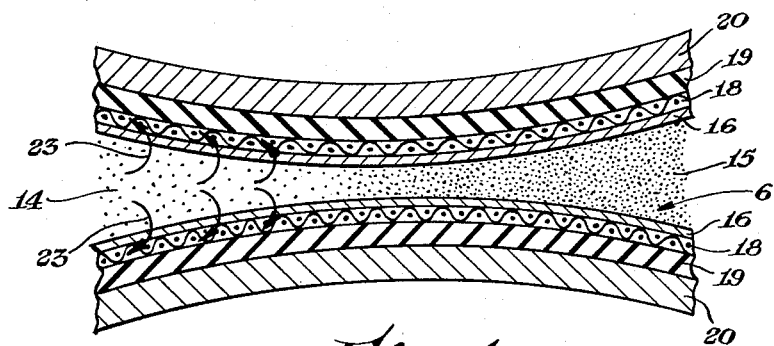
Figures 4 and 5 schematically illustrate and contrast the densening method of the present invention and conventional techniques.

The foraminiferous surfaced roll may advantageously be embodied in a manner similar to the roll that is schematically depicted in Figures 2 and 3. Thus, the outer, relatively flexible surface layer 16 may be a cloth or fabric supported by a rigid foraminous cylinder 18 that advantageously may be a metal screen, or the like. It is usually desirable for the outer layer 16 to be a cloth or fabric constructed from textile fibers such as cotton, Saran or nylon fibers or from metal filaments. If desired, it may be beneficial for the outer foraminulous layer 16 and its supporting foraminous substrate 18 to be formed about a roll core consisting of strong metal or other inner cylinder 20 that, optionally, may have a resilient rubber or other covering 19. The roll may be supported at its ends through the cylindrical end flange sections 21.

As mentioned, the average intersticial foraminule size of the outer surface layer should be finer than the particle size of the material being densened so that it can be effectively nipped by the roll without penetrating therethrough. Many cloth and fabric constructions can be employed for such purposes, their selection depending, of course, upon the average particle size of the high bulk material desired to be consolidated and the resistance to abrasion or wearing that may be desired or necessary in the outer foraminulous layer. An ordinary brass screen of about 12 mesh size or so is frequently suitable for the rigid supporting layer for the outer surface. If desired, the supporting foraminous layer 18 can be made strong and rigid enough to dispense with any other inner core construction or arrangements in the foraminulous surfaced roll.

Figure 5:
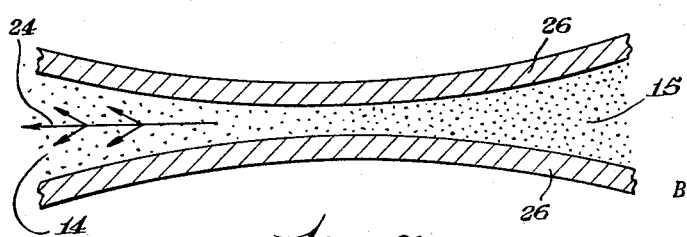

In operation, the densening mill of the present invention effectively compresses the high bulk particulate material while permitting the entrained air being squeezed out to escape through the surface of the roll to avoid its backward propulsion through the oncoming path of the material being fed to the mill. This is illustrated by the directional arrows 23 in Figure 5 which illustrate the path of escape of air through the foraminiferous roll surfaces from the material being densened in a nip roll mill according to the invention. Such disposition of air facilitates handling of the particulate material at a high productive rate since faster roll speeds do not literally cause the light fluffy powder to be blown out of the compressive bight of the mill. In contrast, the effect of conventional hard and impervious surfaced rolls 26 is shown in Figure 5 by the directional arrows 24 illustrating the backward path of the air being squeezed out of the particulate material. This prevents operation at desirably high rates since, under such conditions, the turbulent and vigorous forcing of the air out of the bight of the rolls keeps the light fluffy material from satisfactory entrance therebetween.

By way of further illustration, a pair of rubber covered steel nip rolls were provided with a circumferential layer of 12 mesh brass screen that was covered with an outer surface layer of Saran filter cloth that was square woven to a 60 x 28 construction using a two-ply warp and three-ply filling that were prepared from 750 denier monofilament. The cloth had a weight of about 20.8 ounces per square yard. One of the rolls was positively driven at rates that ranged from about three to four revolutions per minute and the other roll was an idler that was compressively urged against the driven roll by a piston in an eight inch diameter pneumatic cylinder containing air under a pressure of about 50 pounds per square inch gauge. The rolls were employed to compress a light, fluffy polyethylene powder having an initial bulk density of about five pounds per cubic foot to a densened material having a bulk density of about twenty pounds per cubic foot to achieve about a 400 percent compression of the powder. They were consistently able to accomplish this in single pass operation at outputs of between about 500 to 600 pounds per hour.

In contrast, when solid surfaced, rubber-covered nip rolls of the same type operated in the same manner and at the same speed were employed to compact the same high bulk low density powder to the same degree of consolidation, they were able to achieve a maximum production rate of only about 100 pounds per hour. Solid corrugated rolls and solid rolls textured to imitate the fabric surface of the foraminiferous rolls were also employed without noticeably increasing the densening rate of the polyethylene powder over that obtainable with the plain surfaced rolls.

Individuals skilled in the art will instantly appreciate that many changes and modifications can be entered into in the practice of the present invention without substantially departing from its intended spirit and scope. Hence, the invention is to be construed and interpreted not by the preferred embodiments illustrating the foregoing descriptions and specification but in the light of what is set forth and defined in the hereto appended claims.

What is claimed is:

1. Densening mill for high bulk particulate materials consisting essentially of a pair of rolls in nip roll arrangement, the outer surface of said rolls consisting of a relatively flexible layer of an air-permeable foraminulous material having an average intersticial foraminule size finer than the average particle size of the material intended for passage through said mill, a rigid foraminous cylinder supporting said outer surface layer and having coarser foramina therein than the foraminules in said surface layer, means for rotating said rolls, and means for urging said rolls and their opposing surface together to provide a compressive bight therebetween.

2. A densening mill according to claim 1, wherein the outer surface of each of said rolls is cloth and the supporting layer for each of said outer cloth surfaces is a rigid, cylindrical metal screen.

References Cited in the file of this patent

UNITED STATES PATENTS

| Re. 19,137 | Wright et al. | Apr. 17, 1934 |
| 761,878 | Cooley | June 7, 1904 |
| 2,633,074 | Davis | Mar. 31, 1953 |
| 2,806,771 | Cuthbertson et al. | Sept. 17, 1957 |

FOREIGN PATENTS

| 578,658 | Great Britain | July 8, 1946 |
| 721,866 | Great Britain | Jan. 12, 1955 |